United States Patent [19]

Takeuchi

[11] Patent Number: 4,543,464

[45] Date of Patent: Sep. 24, 1985

[54] APPARATUS FOR SCRIBING SEMICONDUCTOR WAFER WITH LASER BEAM

[75] Inventor: Bunzi Takeuchi, Sagamihara, Japan

[73] Assignee: Tokyo Shibaura Denki Kabushiki Kaisha, Kawasaki, Japan

[21] Appl. No.: 514,330

[22] Filed: Jul. 15, 1983

[30] Foreign Application Priority Data

Jul. 19, 1982 [JP] Japan .................. 57-125356

[51] Int. Cl.⁴ .............................. B23K 26/00
[52] U.S. Cl. ................ 219/121 LH; 219/121 LY
[58] Field of Search .............. 219/121 LH, 121 LJ, 219/121 LY, 121 LA, 121 LB, 121 LU

[56] References Cited

U.S. PATENT DOCUMENTS

| | | | |
|---|---|---|---|
| 3,267,249 | 8/1966 | Veth | 219/121 LD X |
| 4,154,530 | 5/1979 | Connolly, Jr. et al. | 219/121 LX X |
| 4,190,759 | 2/1980 | Hongo et al. | 219/121 LY X |
| 4,224,101 | 9/1980 | Tijburg et al. | 219/121 LM X |
| 4,358,658 | 11/1982 | Van Blarigan et al. | 219/121 LY X |

*Primary Examiner*—C. L. Albritton
*Attorney, Agent, or Firm*—Finnegan, Henderson, Farabow, Garrett & Dunner

[57] ABSTRACT

An apparatus is adapted to scribe a semiconductor wafer with a laser beam in only one direction of an axis. The apparatus includes an XY table for placing the wafer thereon, a laser beam oscillator provided above the XY table, and an optical system for permitting the laser beam to be directed onto the wafer on the XY table. In order to scribe the wafer in only one direction, the apparatus further includes a light interrupting switch adapted to permit the laser beam to pass when the XY table is moved in only one direction in synchronism with an XY table driving motor and to permit the laser beam to be interrupted when the XY table is moved in the other directions.

8 Claims, 11 Drawing Figures

APPARATUS FOR SCRIBING SEMICONDUCTOR WAFER WITH LASER BEAM

BACKGROUND OF THE INVENTION

I. Field of the Invention

This invention relates to an apparatus for scribing a semiconductor wafer with a laser beam.

II. Description of the Prior Art

A semiconductor substrate of a semiconductor device is formed by cutting a disc-like semiconductor wafer along dicing lines. The step of cutting is performed by cutting grooves along the dicing lines in the surface of the semiconductor wafer and breaking off the wafer along the grooves to separate it from the rest of the wafer. "Scribing" refers to grooving the semiconductor along the dicing line. The scribing step has heretofore been performed with a laser beam. A conventional scribing apparatus includes a support base and an XY table assembly on the support base. The XY table assembly comprises a first table (X table) movable along the X-axis of the XY coordinate system and a second table (Y table) movable along the Y-axis. The X and Y tables are driven by a pulse motor and DC motor, respectively. A 90°-rotatable vacuum chuck is disposed on the Y table to fixedly suck the semiconductor wafer on the Y table. A laser beam oscillator is located on a diagonally upper side of the Y table. An optical system is arranged above the Y table to permit a laser beam emitted horizontally from the laser beam oscillator to be directed toward the surface of the semiconductor wafer. The optical system comprises a reflective plate for normally shifting the direction of the laser beam emitted horizontally from the laser beam oscillator by 90° and a lens for causing the laser beam reflected by the reflective plate to be focused onto the surface of the wafer.

The operation of the above-mentioned conventional scribing apparatus will be explained below by referring to FIGS. 1 to 3.

FIG. 1 is a timing chart showing a clock pulse sent to the DC motor for driving the Y table and FIG. 2 is a timing chart showing a clock pulse sent to the pulse motor for driving the X table.

First, the semiconductor wafer is fixedly sucked on the vacuum chuck. Then, the DC motor is started at time $T_1$ as shown in FIG. 1, to move the Y table negatively in the Y axis by an amount substantially corresponding to the diameter of the disc-like wafer. A laser beam is emitted from the laser beam oscillator and through the optical system it forms a groove (scribing line) in the Y axis direction in the surface of the wafer on the vacuum chuck. During this operation, the X table is stopped as shown in FIG. 2. At time $T_2$, the DC motor is halted to cause the Y table to stop. At the same time, the pulse motor is started as shown in FIG. 2, causing the X table to be shifted negatively in the X axis by a predetermined distance and stopping the X table at time $T_3$. At time $T_3$, the Y table is shifted positively in the Y axis by an amount corresponding to the time interval $T_3$ to $T_4$. Such operations are repetitively carried out, completing all the scribing operations in the Y direction and driving the DC motor and pulse motor to permit the X and Y tables return to the original positions.

Then, the vacuum chuck is rotated counterclockwise through an angle of 90° and the above-mentioned operation is repeated, completing all the scribing operations in the X axis direction.

FIG. 3 is a view explaining the scribing operations which are effected in the X and Y directions with respect to the wafer 10. The scribing line 12 is formed in the directions indicated by arrows in FIG. 3.

In the conventional scribing apparatus, the laser beam is continuously directed onto the surface of the wafer during the X and Y direction scribing operations including the position shifting operations. In this way, the surface of the wafer is scribed positively and negatively in the X axis. In the Y direction, the scribing operation is also performed positively and negatively. Thus, no inconvenience is encounted when the surface of a semiconductor wafer consisting of silicon is scribed by the conventional scribing apparatus. However, where the surface of a silicon-on-sapphire (SOS) wafer is scribed by the conventional scribing apparatus, microcracks tend to develop in the wafer when the scribing operation is performed in a certain direction. That is, when the SOS wafer is scribed positively and negatively in the X axis, microcracks are likely to occur in one of the directions. When the SOS wafer is scribed by the apparatus positively and negatively in the Y axis, the same defects are likely to occur in one of the directions. When a scribing line about 100 µm thick, for example, which permits the wafer to be broken along the scribing line, was formed by the conventional apparatus in the surface of the SOS wafer about 400 µm, no microcracks were developed along the scribing line in the negative direction of the Y axis, but microcracks occurred along the scribing line in the positive direction of the Y axis. The same defects were also observed in the X axis direction. Such a phenomenon is believed to occur due to the crystallinity or cleavage of the sapphire substrate. If such microcracks occur in the sapphire wafer, damage is caused to the resultant semiconductor element.

SUMMARY OF THE INVENTION

It is accordingly the object of this invention to provide an apparatus for scribing a semiconductor wafer, such as an SOS wafer, with a laser beam without causing microcracks.

According to this invention, there is provided an apparatus for scribing a semiconductor wafer with a laser beam, comprising an XY table for placing the semiconductor wafer thereon, a motor for driving the XY table, a laser beam oscillator provided above the XY table, an optical system for directing a laser beam from the oscillator onto the XY table. The apparatus of the invention further comprises a light interrupting switch disposed on an optical path of the laser beam and connected to the motor, the light interrupting switch permitting the laser beam from the oscillator to pass when the XY table is moved in a predetermined direction in synchronism with the motor and interrupting the laser beam from the oscillator when the XY table is moved in other directions.

The apparatus of this invention scribes a semiconductor wafer with a laser beam in only one of the positive and negative directions of X and Y axes. For this reason, it is possible to scribe a SOS wafer with the laser beam in a direction in which no microcracks occur in the wafer. Thus, it is possible to scribe the SOS wafer with the laser beam without producing microcracks therein.

DETAILED DESCRIPTION OF THE PREFERRED EMBODIMENT

The embodiment of this invention will be explained below by referring to the accompanying drawings.

Figure 1:
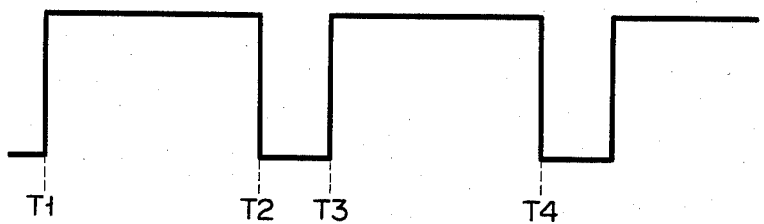
FIGS. 1 and 2 are timing diagrams showing clock pulses sent to a DC motor or a pulse motor of a conventional apparatus.
Figure 2:
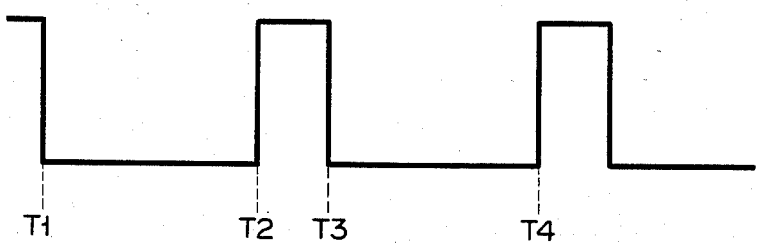
Figure 3:
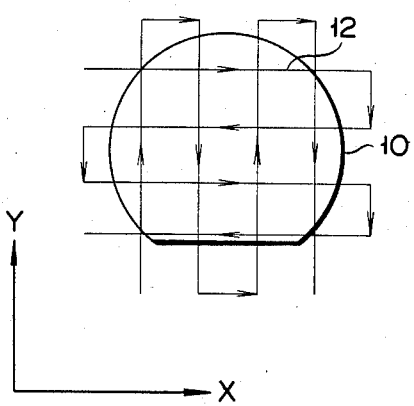
FIG. 3 shows directions in which a semiconductor wafer is scribed by the conventional apparatus.
Figure 4:
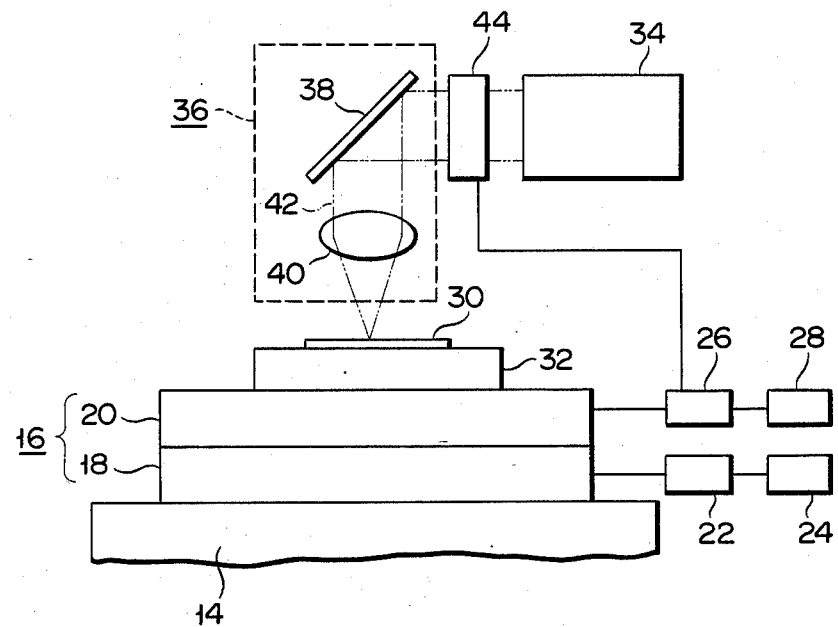
FIG. 4 is a view schematically showing an apparatus of this invention.

As shown in FIG. 4, an apparatus of this invention includes a support base 14 on which an XY table assembly 16 is placed. The XY table assembly 16 comprises a first table (X table) 18 movable in an X axis direction of XY coordinate axes and second table (Y table) 20 movable in a Y axis direction of the same coordinate system. The X table 18 is connected to, and driven by, a pulse motor 22. The pulse motor 22 is connected to a pulse generator 24. The Y table 20 is connected to, and driven by, a DC motor 26 which in turn is connected to a DC converter 28. A vacuum chuck 32 which can rotate at least 90° is placed on the Y table 20 to permit a semiconductor wafer 30 to be fixed thereon. A laser beam oscillator 34 is located on a diagonally upper side of the Y table 20. An optical system 36 is located above the Y table 20 to permit the laser beam horizontally emitted from the laser beam oscillator 34 to be directed onto the semiconductor wafer 30 fixed on the chuck 32. The optical system 36 is comprised of a reflective plate 38 for permitting the direction of the laser beam horizontally emitted from the laser beam oscillator 34 to be bent through an angle of 90° and a lens 40 for focusing the laser beam 42 reflected by the reflective plate 38 on the wafer 30.

Figure 5:
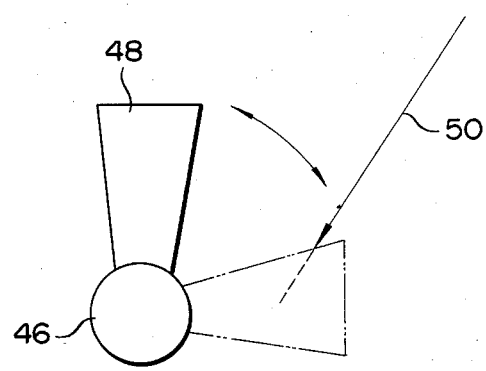
FIG. 5 is a view showing one example of a light interrupting switch of the apparatus according to the present invention.

The above-mentioned arrangement is identical to that of the conventional scribing apparatus. The scribing apparatus of this invention includes, in addition to the above-mentioned arrangement, a light interrupting switch 44 disposed on an optical path of the laser beam and connected to the DC motor 26 or the pulse motor 22. The light interrupting switch 44 permits the laser beam from the oscillator 34 to pass only when the XY table assembly 16 is moved in a predetermined direction and permits the laser beam from the oscillator 34 to be interrupted when the XY table assembly 16 is moved in other directions. In the apparatus as shown in FIG. 4, the light interrupting switch 44 is disposed between the laser beam oscillator 34 and the optical system 36 and connected to the DC motor 26 for driving the Y table 20. The light interrupting switch may, for example, comprise a metallic blade 48 and a rotating section 46 of a widely known rotary solenoid switch (See FIG. 5). In this case, with the rotary solenoid switch ON, the blade 48 takes a position in which the laser beam 50 is not interrupted. With the rotary solenoid switch OFF, the rotating section 46 is rotated to permit the laser beam 50 to be interrupted by the blade 48.

Figure 6:
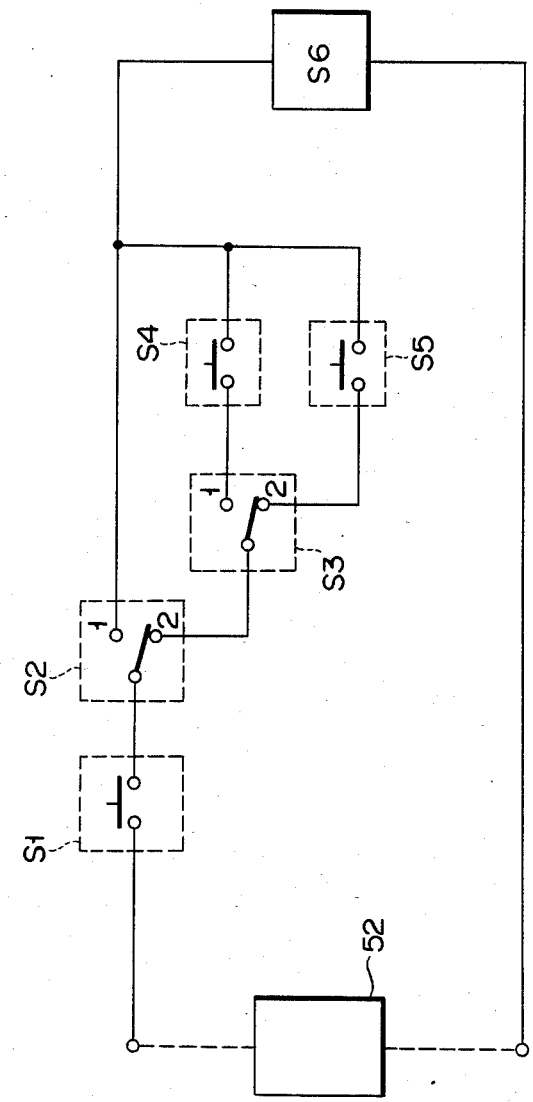
FIG. 6 is a view showing one example of a switch system which can be used for the apparatus according to the present invention.

FIG. 6 shows one example of a switch system as used in the apparatus of this invention. A start switch $S_1$ interlocked with a table driving switch (not shown) is connected to one end of a power source 52 and a first changeover switch $S_2$ is connected to the start switch $S_1$. A first fixed contact 1 of the first changeover switch $S_2$ is connected to one end of a rotary solenoid switch $S_6$. The other end of the rotary solenoid switch $S_6$ is connected to the other end of the power source 52. With a movable contact of the first chageover switch $S_2$ thrown on the first fixed contact side thereof, the rotary solenoid switch $S_6$ is turned ON always permitting the laser beam to pass. Therefore, the apparatus of this invention can be used in the same way as the conventional apparatus. The second fixed contact 2 of the first changeover switch $S_2$ is connected to a second changeover switch $S_3$. A first electric circuit switch $S_4$ is connected to a first fixed contact 1 of the second changeover switch $S_3$ and operated in accordance with a change in the polarity of the DC converter 28 for driving the DC motor 26 which in turn drives the Y table 20. That is, the first electric circuit switch $S_4$ is turned ON when the Y table 20 is moved in the positive direction and turned OFF when the Y table 20 is moved in the negative direction. A second electric circuit switch $S_5$ is connected to the second fixed contact 2 of the switch $S_3$ and operated in accordance with a change in the polarity of the DC converter 28. That is, the second electric circuit $S_5$ is turned OFF when the Y table 20 is moved in the positive direction and turned ON when the Y table 20 is moved in the negative direction. A parallel circuit of the first and second electric circuit switches $S_4$ and $S_5$ is connected to the rotary solenoid switch $S_6$. With the changeover switch $S_3$ thrown on a first fixed contact side thereof, a scribing operation is effected only when the Y table is moved in the positive direction. With the changeover switch $S_3$ thrown on the second fixed contact side, the scribing operation is effected only when the Y table is moved in the negative direction. Thus, it is possible to change the direction in which the scribing operation is carried out.

The operation of the apparatus having the circuit arrangement shown in FIG. 6 will be explained below.

First, the positive or negative directions of the X and Y axes are determined in the SOS wafer, in which no microcrack is produced. The SOS wafer has normally an orientation flat. For convenience's sake, the X axis means a direction parallel to the orientation flat and the Y axis means a direction perpendicular to the orientation flat. A scribing line is formed, in the positive and negative directions of the X axis, in the marginal edge of the wafer. The scribed line so formed was observed under a mineral microscope with a magnification of ×200 and the direction in which no microcrack is produced is determined. Similarly, the direction of the Y axis in which no microcrack is produced is determined. For convenience's sake, it is assumed that no microcracks are produced in the negative direction of the X axis and in the positive direction of the Y axis.

Then, the wafer is fixedly sucked on the vacuum chuck. At this time, the orientation flat is located so that it is parallel to the direction of movement of the X table 18. The movable contact of the first changeover switch $S_2$ is thrown on the second fixed contact 2 side thereof and the movable contact of the second changeover switch $S_3$ is thrown on the second fixed contact side thereof. By so doing, the surface of the wafer is scribed only when the Y table is moved in the negative direction (i.e. the surface of the wafer is scribed in the positive direction).

Figure 7:
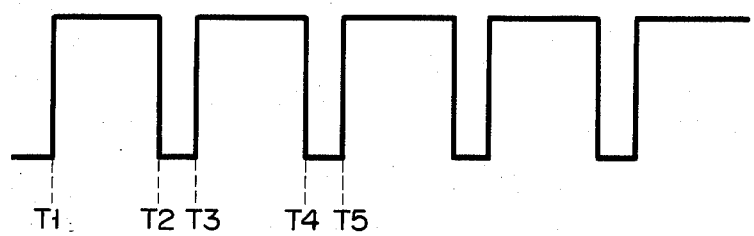
FIGS. 7 to 9 show timing charts of clock pulses supplied to a DC motor, pulse motor and light interrupting switch, respectively, of the apparatus of this invention.
Figure 8:
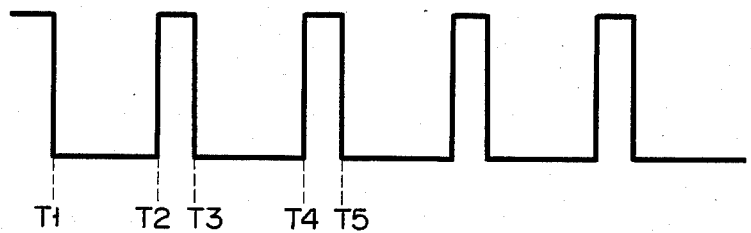
Figure 9:
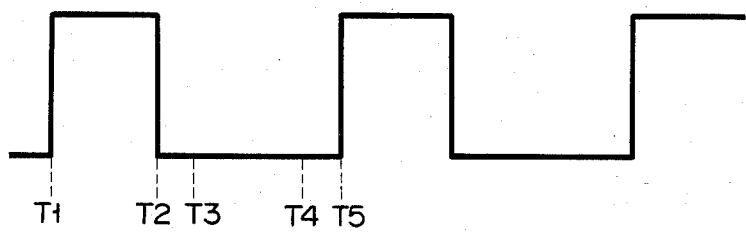

During this operation, clock pulses as indicated by timing charts in FIGS. 7, 8 and 9 are supplied to the DC motor 26, pulse motor 22 and rotary solenoid switch $S_6$, respectively. When the start switch $S_1$ interlocked with the table driving switch is turned ON, the Y table is rendered in the ON state and at time $T_1$ the Y table starts to move in the negative direction. At this time, the rotary solenoid switch $S_6$ is rendered ON, allowing the laser beam to scribe the wafer in the positive direction. The Y table 20 is moved by an amount corresponding to about the diameter of the wafer, reaching time $T_2$. As shown in FIG. 7, at time $T_2$ the Y table 20 is stopped and the pulse motor 22 is turned ON, causing the X table 18 to be moved in the negative direction. At time $T_2$, the rotary solenoid switch $S_6$ is turned OFF as shown in FIG. 9 to cause the laser beam 50 (See FIG. 5) to be interrupted by the blade 48. At time $T_3$, the pulse motor 22 is turned OFF as shown in FIG. 8 stopping the X table 18. At the same time, the Y table is turned ON, causing the Y table 20 to move in the positive direction. At this time, the rotary solenoid switch $S_6$ remains OFF as shown in FIG. 9 and the laser beam 50 remains interrupted by the blade 48. Thus, the wafer is not scribed when the Y table 20 is moved in the positive direction (i.e. the wafer is not scribed in the negative direction of the X axis). The Y table 20 is moved in the positive direction by an amount nearly equal to the diameter of the wafer, reaching time $T_4$. At time $T_4$, the Y table 20 is stopped as shown in FIG. 7, and at the same time, the X table 18 is turned ON and then moves in the negative direction of the X axis as shown in FIG. 8. Even at this time, the rotary solenoid switch $S_6$ is turned OFF. At time $T_5$, the X table 18 is stopped and the Y table 20 is moved in the negative direction. At time $T_5$, the rotary solenoid switch $S_6$ is turned ON and the scribing operation is restarted. Thereafter, the above-mentioned cycle is repeated.

Figure 10:
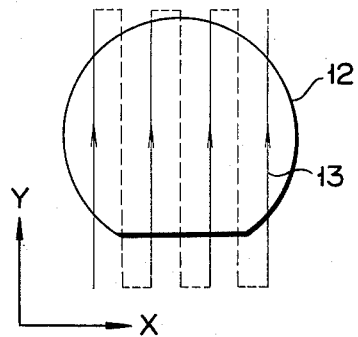
FIGS. 10 and 11, each, show directions in which the semiconductor wafer is scribed by the apparatus of this invention.

FIG. 10 shows the scribing line formed in the Y axis. In FIG. 10, the solid lines represent an actual scribing line and the arrows represents the scribing direction.

The vacuum chuck 32 is rotated counterclockwise through an angle of 90°. Since, as described above, the negative direction of the X axis is the direction in which no microcracks occur, the movable contact of the second changeover switch $S_3$ is thrown on the first fixed contact side thereof. In this case, the wafer is scribed only when the Y table 20 is moved in the positive direction. Thereafter, the scribing operation is performed in the Y axis in the same way as mentioned above.

Figure 11:
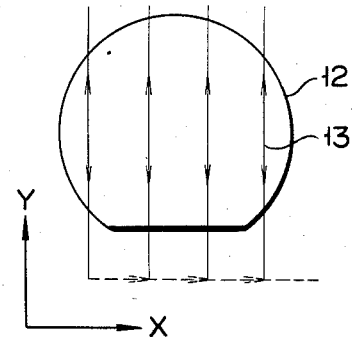

Although this invention has been explained in connection with the preferred embodiment, replacement, modification, deletion and addition may be made without departing from the spirit and scope of this invention. For example, as shown in FIG. 11, the timing of clock pulses from the pulse generator 24 may be changed and, in this case, position shifting may be performed by moving the Y table in the negative direction of the Y axis by an amount corresponding to substantially the diameter of the wafer, moving the Y table in the positive direction of the Y axis without moving the X table, and then moving the X table in the negative direction. In this case, only when the wafer is moved in one of the positive and negative directions of the Y axis, the light interrupting switch is turned ON, performing a scribing operation.

What is claimed is:

1. An apparatus for scribing a semiconductor wafer with a laser beam, comprising:
    an XY table for placing a semiconductor wafer thereon;
    a motor for driving the XY table in X and Y directions;
    a laser beam oscillator disposed above the XY table;
    an optical system for targeting the laser beam from the laser beam oscillator on the semiconductor wafer which is placed on the XY table; and
    light interrupting means operated in accordance with the direction of movement of the XY table for passing the laser beam from the laser beam oscillator only when the XY table is moved in a predetermined direction in synchronism with the motor and for interrupting the laser beam from the oscillator when the XY table is moved in other directions, said light interrupting means including a light interrupting switch positioned in the path of the laser beam.

2. The apparatus according to claim 1, wherein said light interrupting switch is a rotary solenoid switch having a blade on its rotating section to interrupt the laser beam.

3. The apparatus according to claim 1, wherein said XY table comprises an X table and Y table disposed one over the other, said X table being movable in an X axis of an XY coordinate system and said Y table being movable in a Y axis of the XY coordinate system.

4. The apparatus according to claim 3, wherein said X and Y tables are driven by a pulse motor and a DC motor, respectively.

5. The apparatus according to claim 4, wherein said DC motor is driven by a DC converter.

6. The apparatus according to claim 3, wherein said light interrupting means includes a changeover switch movable to first and second positions, when said changeover switch is in said first position, said light interrupting means passes the laser beam when the Y table is moved in a positive direction and interrupts the laser beam when the Y table is moved in a negative direction, and when said changeoever switch is switched to said second position, said light interrupting means interrupts the laser beam when the Y table is moved in a positive direction and passes the laser beam when the Y table is moved in a negative direction of an XY coordinate system.

7. The apparatus according to claim 6, wherein said Y table is driven by a DC motor; said DC motor is driven by a DC converter; and said light interrupting means includes the light interrupting switch being connected through said changeover switch to parallel first and second electric switches operated in response to a change in the polarity of the DC converter, the first electric switch turning ON when the Y table is moved in the positive direction and OFF when the Y table is moved in the negative direction, the second electric switch turning OFF when the Y table is moved in the positive direction and ON when the Y table is moved in the negative direction.

8. The apparatus according to claim 1, further comprising a chuck disposed on the XY table, rotatable through an angle of at least 90° and adapted to fix the semiconductor wafer.

* * * * *